March 15, 1949.  H. C. MACK  2,464,327
VEHICLE BRAKE SYSTEM
Filed Sept. 9, 1943  5 Sheets-Sheet 1
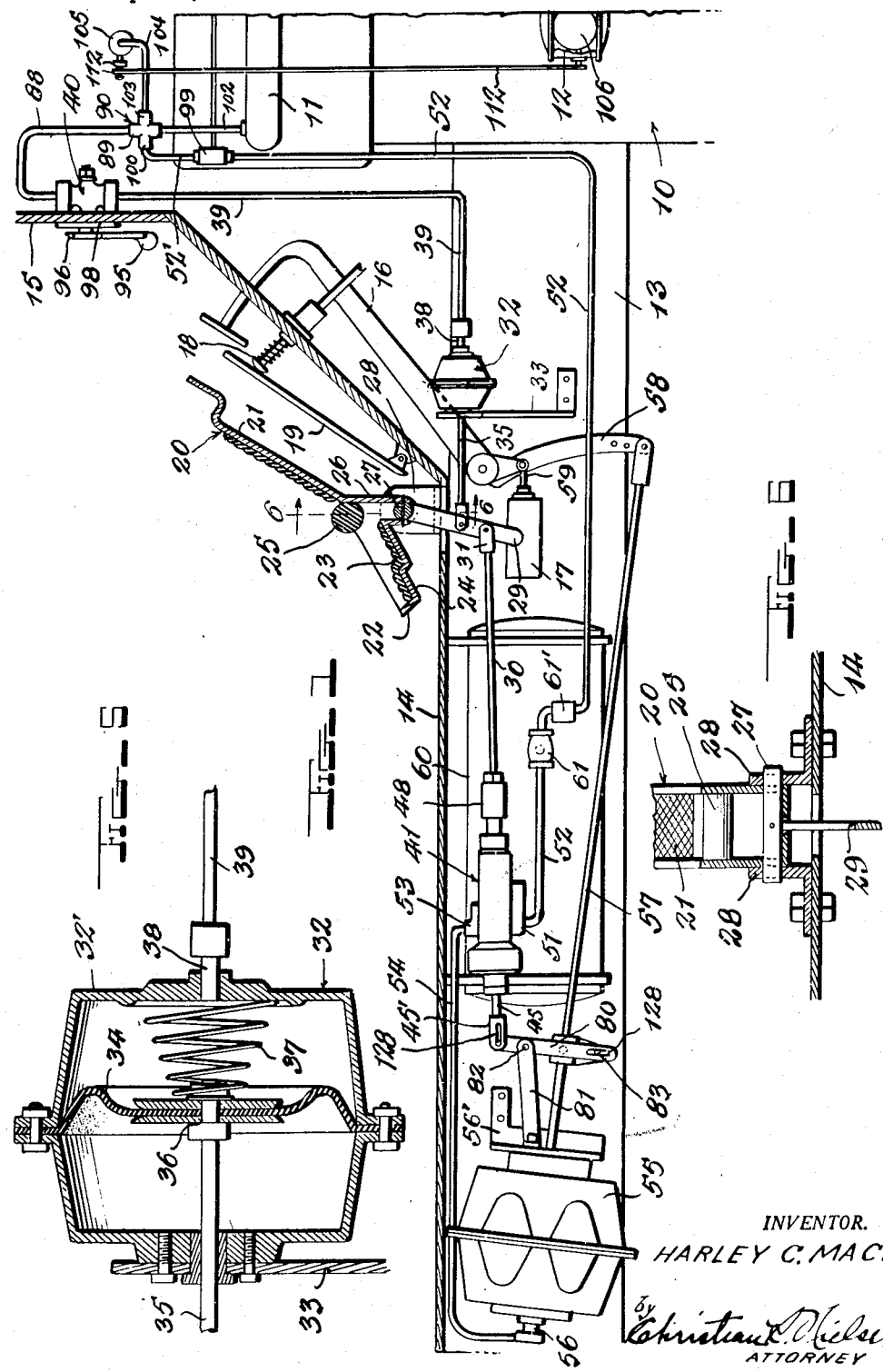
INVENTOR.
HARLEY C. MACK,
by Christian T. Nielsen
ATTORNEY

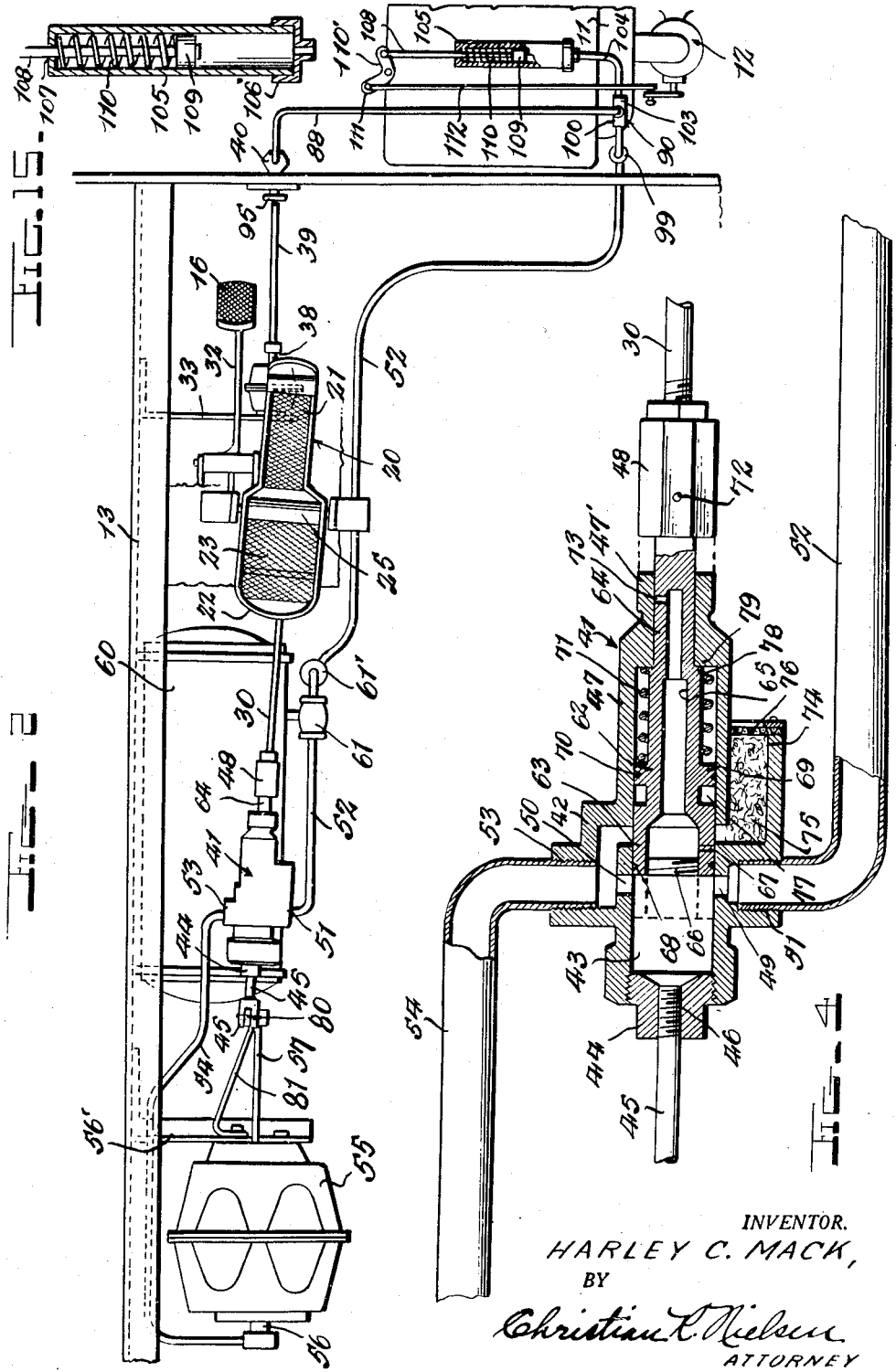

March 15, 1949.   H. C. MACK   2,464,327
VEHICLE BRAKE SYSTEM
Filed Sept. 9, 1943   5 Sheets-Sheet 3
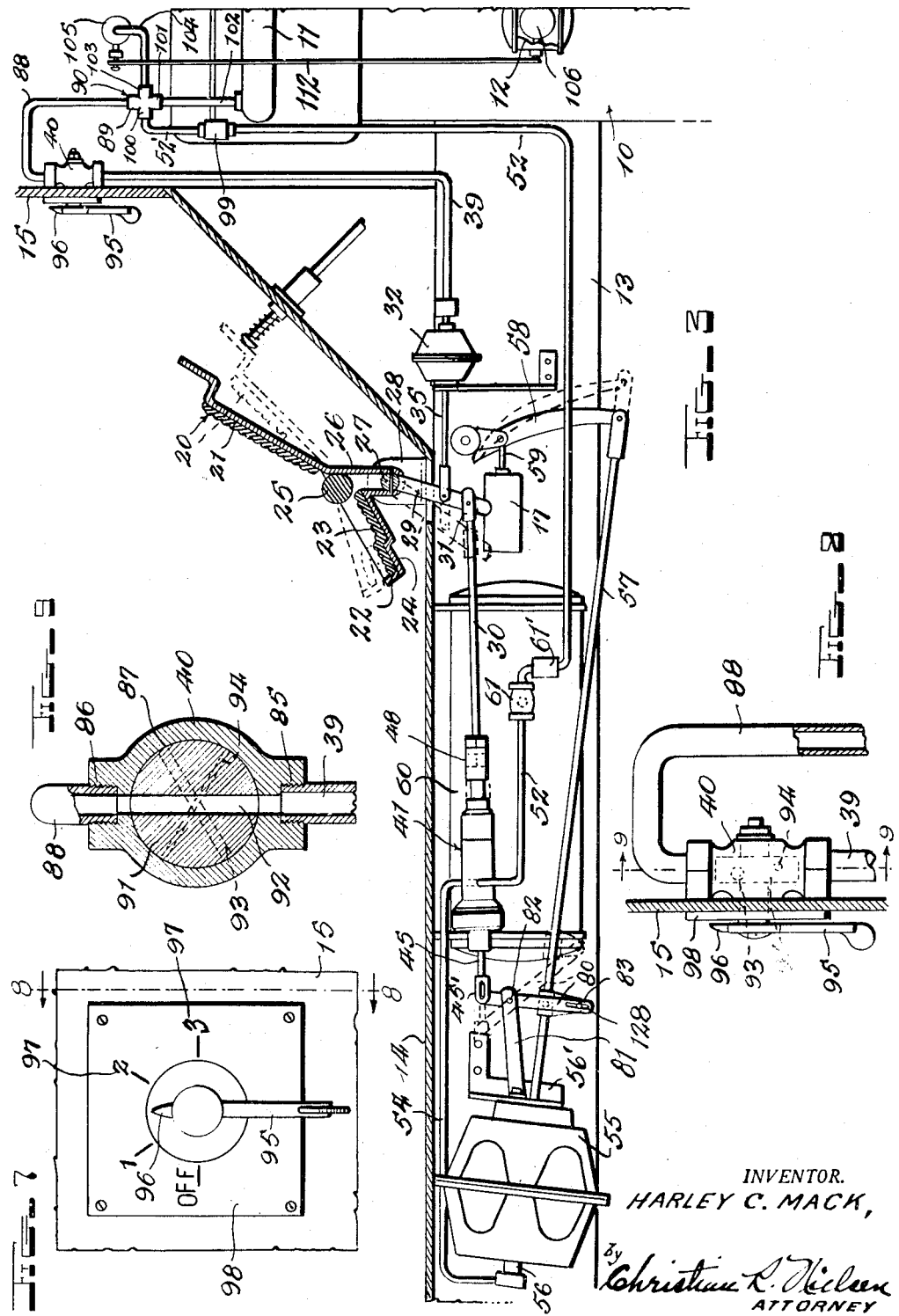
INVENTOR.
HARLEY C. MACK,
by Christian L. Nielsen
ATTORNEY March 15, 1949. H. C. MACK 2,464,327
VEHICLE BRAKE SYSTEM
Filed Sept. 9, 1943 5 Sheets-Sheet 4
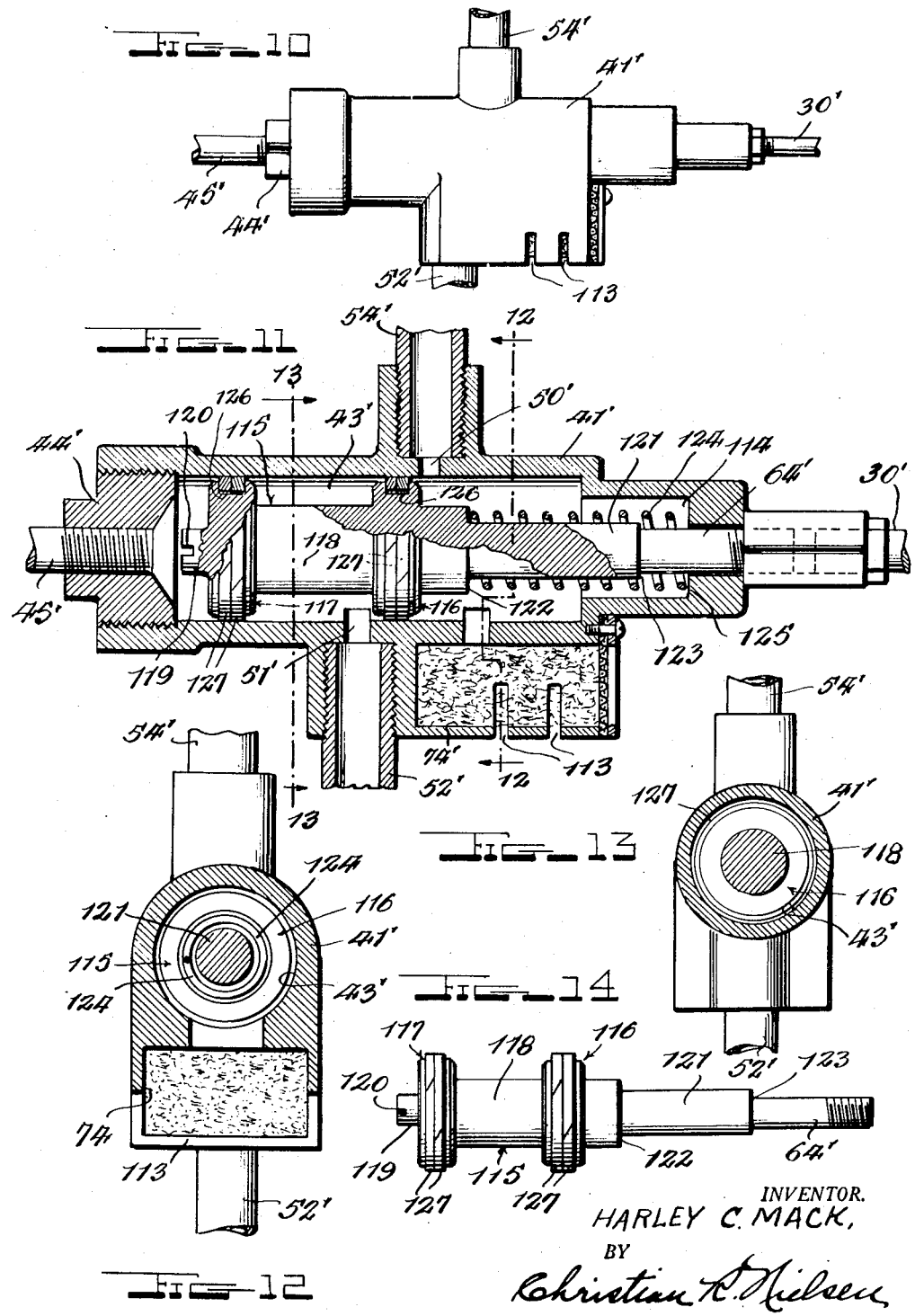
INVENTOR.
HARLEY C. MACK,
BY
Christian K. Nielsen
ATTORNEY.

March 15, 1949. H. C. MACK 2,464,327
VEHICLE BRAKE SYSTEM
Filed Sept. 9, 1943 5 Sheets-Sheet 5

INVENTOR.
HARLEY C. MACK,
BY Christian R Nielsen
ATTORNEY

Patented Mar. 15, 1949

2,464,327

UNITED STATES PATENT OFFICE 2,464,327

VEHICLE BRAKE SYSTEM

Harley C. Mack, St. Louis, Mo.

Application September 9, 1943, Serial No. 501,690

10 Claims. (Cl. 192—3)

This invention relates to a power and brake control for motor vehicles and the like, and it consists in the constructions, arrangements and combinations herein described and claimed.

It is a particular object of the invention to provide a novel construction of pedal in which the forward acceleration and braking action is accomplished by a single foot pedal.

It is a further object of the invention to provide a braking system in which the brakes are automatically applied upon removal of the foot from the accelerator pedal, or in which the pressure upon the pedal is reduced, thus lending the braking system of unusual value in case the operator of the vehicle should become permanently or temporarily incompetent of controlling the vehicle.

More particularly, it is the object of the invention to provide a novel braking system in which a vacuum created by the engine of the vehicle will function in the application of the brakes.

It is a still further object of the invention to provide a novel braking system in which the accelerator pedal controls the power of the engine as well as the brakes, thus adapting the system to holding of a vehicle upon an up-grade, without necessity of separate brake application or "riding" of the clutch as is often practiced, in order to hold the vehicle against backward rolling.

It is also an important object of the invention to provide a power and brake control in which a decided saving of gas is important and in which wear on the brake lining and the vehicle is reduced to a minimum.

Additional objects, advantages and features of invention will be apparent from the following description considered in conjunction with the accompanying drawings, wherein Figure 1 is a fragmentary sectional view of a conventional vehicle (including a brake pedal) having my brake system installed, in braking position.

Figure 2 is a fragmentary top plan view thereof.

Figure 3 is a view similar to Figure 1 in which the brake pedal is removed.

Figure 4 is a longitudinal sectional view, partly in elevation, illustrating the control valve.

Figure 5 is a sectional view illustrating the miniature power chamber.

Figure 6 is a fragmentary sectional detail illustrating the mounting of the pedal control taken on the line 6—6 of Figure 1.

Figure 7 is a front elevation of the manual control valve.

Figure 8 is a section on the line 8—8 of Figure 7.

Figure 9 is a cross section on the line 9—9 of Figure 8.

Figure 10 is a side elevation of a modified form of control valve.

Figure 11 is a horizontal section therethrough.

Figure 12 is a vertical section on the line 12—12 of Figure 11.

Figure 13 is a vertical section on the line 13—13 of Figure 11.

Figure 14 is a side elevation of the control valve removed from the valve housing.

Figure 16 is a fragmentary sectional view illustrating a braking system in which control of the valve is effected by the use of braking fluid of a hydraulic brake system, the parts being shown in braking position.

Figure 15:
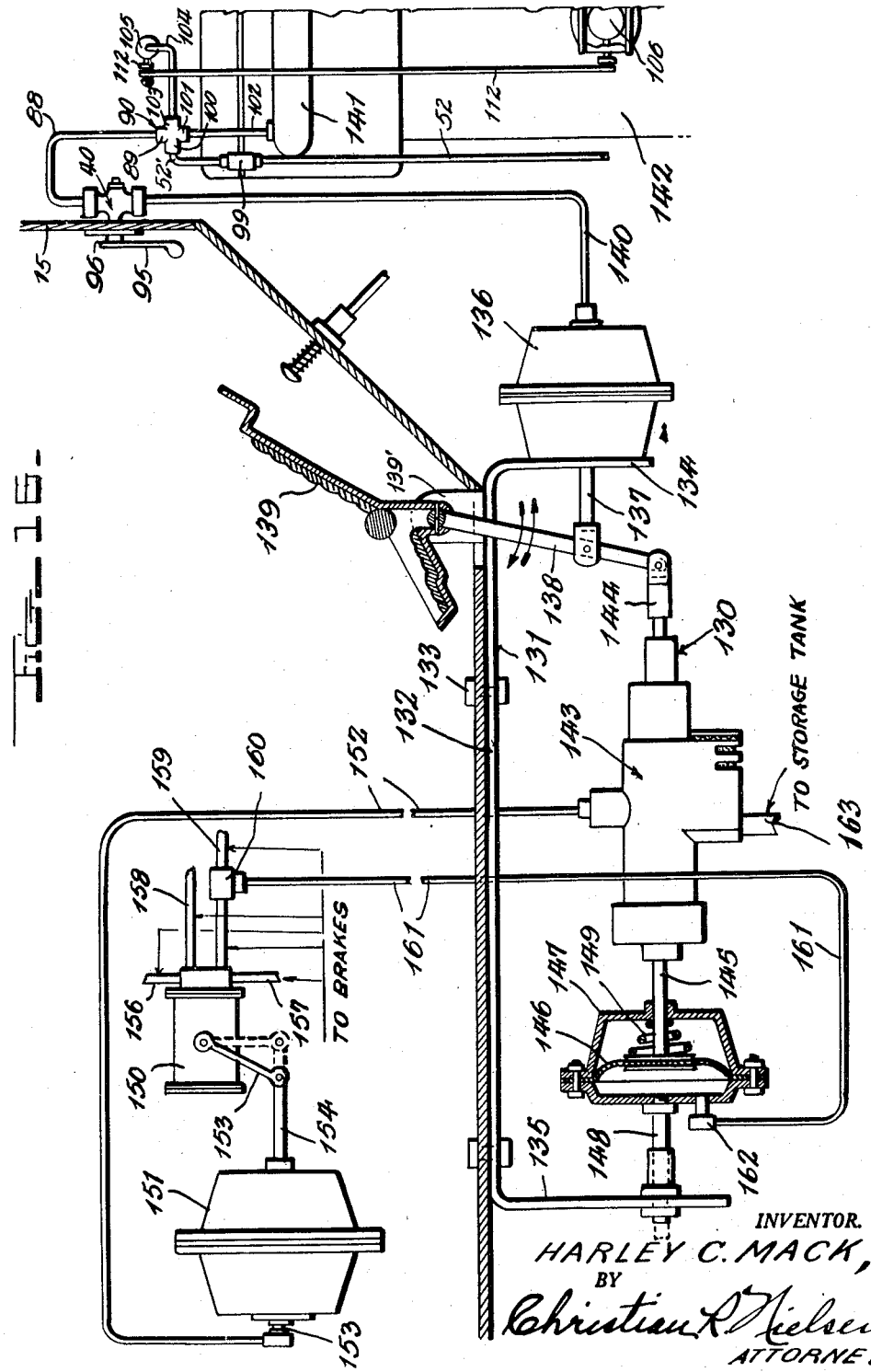
Figure 15 is an enlarged sectional detail of the throttle control.

There is illustrated formally an engine 10 of conventional construction including as usual an intake manifold 11 and a carbureter 12, the engine being suitably supported upon the chassis 13 of the vehicle, as is customary. A conventional floor 14 and dash-board 15 is shown for support of mechanism presently to be described.

As shown in Figure 1, there is a foot brake 16 forming a part of the present day motor vehicle, operatively connected to a master cylinder 17 whereby application of the brakes of a vehicle may be effected. The connection between the master cylinder 17 and respective brake is not shown, since such construction is well understood and it is believed not essential to the understanding of my braking system. I also show a conventional accelerator 18 and foot pedal 19 for feeding gaseous fuel to the engine, connections between the accelerator and the carburetor also being omitted, since the arrangement may vary in different types of motors. It is sufficient to say that when the accelerator is depressed, the throttle of the carburetor is opened so as to increase the speed of the engine. The accelerator is not directly depressed by the foot of the operator but is actuated by means of a novel foot control pedal 20.

The control pedal is formed from suitable gauge sheet metal having a forward foot portion 21 and a heel portion 22. The heel portion 22 is formed with a forward recess 23 at a level below the rearmost portion 24. By this construction, the pedal will be readily adapted to men and women drivers. Intermediate the foot portion 21 and the heel portion 22, an arch support 25 is suitably mounted, preferably formed of rubber or other suitable material, preventing slippage as well as a comfortable support for the foot, and the foot and heel portions are also rubber-coated.

The pedal 20 includes a depending leg 26 within which there is keyed or otherwise rigidly secured a shaft 27, the latter being rockably supported between a pair of brackets 28 fixed upon the floor board 14 (see Figure 6). As may be seen in Figure 2, the pedal 20 is mounted so as to extend in a longitudinal plane directly above the accelerator or foot pedal 19 and is movable in a downward direction so as to engage and depress the accelerator 18.

The pedal 20 is operatively associated with my braking system, and as may be seen from a consideration of Figure 1, the shaft 27 has fixed thereto a downwardly extended lever 29 of substantial length, adjacent the lower end of which a brake rod 30 is pivotally connected by means of a clevis 31.

A power cylinder 32 is mounted upon the chassis 13 by means of a bracket 33, the cylinder 32 being disposed in advance of the lever 29 a suitable distance. The cylinder 32 is of the diaphragm type, as may be seen from Figure 5. The cylinder 32 is more or less conventional in construction and consists of a pair of hollow casing members suitably flanged for securing a diaphragm 34, the latter having sufficient clearance to flex from one casing member into the other, for a purpose to be explained. Upon the rear of the diaphragm 34 a rod 35 is suitably secured as at 36, being pivotally connected to the lever 29 above the point of connection of the rod 30. Upon the opposite or front side of the diaphragm 34 a helical spring 37 is mounted, one end of the spring engaging a suitable seat on the diaphragm with the other seat upon the forward casing member 32'. Thus the spring functions to hold the diaphragm in a neutral medial position. The casing member 32' is axially bored to receive a fitting 38 of a hose line 39 which is operably connected with a manual control valve 40, as will be explained hereinafter.

Attention is now invited particularly to Figure 4 for an understanding of the construction of a control valve, generally indicated by the reference character 41, the structural details of which have been specifically described in my United States Patent No. 2,197,664. The valve consists of a casing 42 having a centrally disposed chamber 43, the rear end of which is closed by a screw-threaded plug 44 into which a rod 45 is threadedly engaged, as at 46, the rod terminating in a clevis 45'. The casing 42 is extended forwardly to provide a cylindrical extension 47 of the chamber 43, which normally, when the brake is off, abuts against a collar 48 connected with the brake rod 30. This position is indicated in dotted lines in Figures 3 and 4. The valve casing 42, at diametrically opposite sides is provided with a pair of ports 49 and 50. The vacuum port 49 leads directly into the interior of the cylinder 43 and its outer end opens into a threaded bore 51, forming a connection with a flexible vacuum line 52 which in turn is connected with the intake manifold 11 of the engine, the connection of which will be described hereinafter. The suction port 50 is in communication with a threaded port 53, establishing a connection with a flexible hose 54, the other end of which is connected with the rear end of a power cylinder 55, as indicated at 56. The power cylinder 55 is of conventional construction and is mounted upon the chassis by a bracket 56'. A brake rod 57 is operatively connected to the piston of the power cylinder 55, extending forwardly for connection with a brake lever 58, the latter being connected with the piston rod 59 of the master cylinder 17.

A storage tank 60 is suitably mounted upon the chassis, preferably having a capacity of 1000 cubic inches, and as may be seen in Figure 2, the hose line 52 is connected to a fitting 61 in communication with the tank 60 upon the opposite side of the fitting 61, a check valve 61' being suitably installed in the line 52.

With further reference to the control valve 41, shown in detail in Figure 4, a reciprocable piston valve 62 is disposed within the chamber 43, having a head 63. The head is hollow and communicates with a hollow stem 64, which projects through the extension 47, the latter being formed with a neck 47', which closely surrounds the stem 64. The hollow head and the bore 65 of the stem constitute a reservoir for lubricant. The bore is closed at the head end of the piston valve by means of a threaded plug 66. The head of the valve is provided with a lubricating port 67 and with grooves 68. The stem is formed with an annular flange 69 which fits within the extension 47 of the valve casing and this flange is provided with an annular groove 70. Surrounding the stem and disposed within the extension 47 there is a compression spring 71 which bears at one end against the flange 69 and at its other ends against the end wall of the extension 47 and forces the valve to its closed position. The terminal of the stem 64 is engaged with a threaded end of the brake rod 30 and is pinned thereto at 72. The bore 65 is provided with an opening 73 which discharges oil against the inner face of the extension 47'. The bore or chamber 65 is designed to contain a special heavy lubricant such as a mixture of graphite and grease for the purpose of keeping the piston valve and the stem lubricated at all times.

The valve casing is formed with a chamber constituting an air duct, the wall of which is designated 74, the chamber being filled with a filter material 75. The end of the chamber is open but extended thereacross is a wire netting 76 holding the filter material in place. An arcuate groove 77 is formed between the flange 62 and the head of the valve and this arcuate groove in closed position of the valve communicates with the chamber 74 and with the entrance of the valve casing on the outlet side thereof. When the valve is in open position as shown, the suction of the engine will draw air across the valve chamber through the port 50 and hose line 54 for application of the brakes through the power cylinder 55. In the closed position of the valve, however, there will be no communication through the port 50, but communication will be established between the brake actuating mechanism and the chamber 74 so that air may enter to break the vacuum in the power cylinder 55.

From the foregoing it will be seen that I have provided a piston valve for application of the brakes of a vehicle by employing the suction created by the engine. However, should the engine go dead, manual application of the brakes is still possible as will be apparent from the following construction. The stem 64 includes a shoulder 78 complemental to a shoulder 79 formed upon the interior of the chamber 43. Thus, a forward pull on the brake rod 30 by backward pressure on the control pedal 20, will cause a forward movement of the control valve 41 with a similar movement of the rod 45. A lever 80 is associated with the clevis 45', pivoted to a fixed fulcrum 81, as at 82. The pivot 82 is located only a short distance below the clevis 45' and the lower end of the lever 81 is operatively connected to the brake rod 57 as at 83. This pivoting of the lever 80 increases the movement of the lower end of the lever for a purpose, as will appear. Thus, the rod 57 will be moved rearwardly imparting movement to the brake lever 58 with consequent operation of the master cylinder 17 for applying the brakes.

It will be understood that the vacuum hose lines 52 and 54 have sufficient slack to permit longitudinal movements of the valve 41 and it will be seen that the lever 80 and the brake lever 29 bear the main support of the valve 41. However, if desired, any suitable slip hanger supports (not shown) may be employed for additional support of the valve, although such an arrangement has not been found necessary.

The connection of the suction hose lines 39 and 52 with the manual control valve 40 and the intake manifold 11 will now be explained. The valve 40 is suitably mounted upon the dash 15 of the vehicle, and as shown in Figure 9 consists of a fitting having diametrically opposed threaded ports 85 and 86, each opening upon a medial circular chamber 87. The bore 85 receives the hose line 39 therein which leads from the miniature power cylinder 32, while the bore 86 receives a hose line 88 operatively connected to a branch 89 of a T-fitting 90. A plug valve 91 is rotatably mounted in the chamber 87 and includes three passages 92, 93 and 94 of progressively decreasing diameters, the passages extending entirely through the plug body and are so arranged as to be selectively aligned between the bores 85 and 86 for free passage of suction therethrough. The plug 91 is rotated by means of an indicator handle 95 conveniently located upon the dash 84. The handle 95 includes a pointer 96 complemental to indications 97 on a face plate 98. We will say that the handle is moved to the indication "1" which will have brought the passage 94 into registry with bores 86 and 87, to establish a vacuous condition in the valve, the rate being determined by the size of the bores in the valve 91. If however, the valve is rotated so that the pointer registers with the indication "2," then passage 93 is brought into registry with the bores 85 and 86 and since this passage is of greater diameter, a higher vacuous condition is involved, and if the final passage 92 is brought into registry with bores 85 and 86, a complete vacuous condition is involved by reason of the increased diameter of the passage. If the indicator is moved to the off position, then suction is closed off entirely, and the brakes would thus have to be operated manually, by slight downward heel pressure on the control valve pedal 20.

The suction hose line 52 includes a check valve 99 operable to admit suction into the line 52 through branch line 52' connected to a branch 100 of the T-fitting 90. A branch 101 of the T-fitting forms a connection for a suction line 102, the other end of which is connected to the intake manifold 11 of the engine. The final branch 103 of the T-fitting 90 has a suction line 104 connected to a piston cylinder 105.

The cylinder 105 is employed for effecting full closure of the throttle valve 106 which is essential where hydromatic shifting of the transmission gears is involved. The cylinder 105 consists of a head 106' having an axial nipple for connection of the hose line 104, the opposite end being closed with the exception of an axial bore 107 through which a piston rod 108 of a piston 109 is extended. A tension spring 110 is interposed between the piston 109 and the closed end of the cylinder tending to hold the valve 106 closed. The spring 110 affords sufficient pull to maintain the valve 106 closed sufficiently for manual gear shifting, but where hydromatic shifting is involved a fully closed throttle valve must be inherent, and this is assured by suction through the line 104. As soon as the throttle valve 106 is opened, the vacuum in the cylinder 105 is partially broken, allowing normal acceleration of the motor. Any suitable connection between the piston and throttle valve may be employed, but in the present case, the rod 108 is pivotally connected to one arm 110' of a bell crank lever, which is pivoted on the engine head or otherwise. The arm 111 of the bell crank lever connects to a link 112, which in turn is pivotally connected to the shaft of the throttle valve 106.

The structure of the brake illustrated in Figure 3 is identical to that shown in Figures 1 and 2, with the exception that the foot brake lever 16 is omitted. This construction would be followed in new car construction. The same reference characters have been employed to designate corresponding parts.

In Figures 10 to 14, I have illustrated a modified construction of foot control valve in which a tandem piston provides a control, highly efficient where high pressure air or vacuum is employed in applying the brakes. Attention is particularly invited to Figure 11, wherein a cylindrical casing 41' is shown, the chamber 43' of which is closed by a threaded plug 44' having a rod 45' threadedly engaged axially thereof. The casing includes a suction port 50' with which a vacuum line 54' is associated. A port 51' is provided in the casing, communicating with the chamber 43' and has a vacuum line 52' which is operatively connected to the storage tank 60, as in the first case. An air duct or chamber 74 is also employed which in addition to the screened opening, additional openings 113 are provided upon the underside of the chamber. It will be noted that the ports 50' and 51' are not in direct alignment as in the first instance, but are offset or spaced longitudinally apart which is essential by employment of the particular type of piston valve. The casing 41' has a forward concentric hollow reduced extension 114 axially bored for reciprocation of a piston rod 64' which is connected to the brake rod 30' as previously explained.

A tandem piston 115 is reciprocably mounted with the chamber 43' and consists of a front and rear piston elements 116 and 117 respectively, integrally formed upon a reduced body member 118. The rear end of the body member is formed with reduced projecting boss 119 transversely slotted as at 120 for reception of a screwdriver for holding the piston against rotation when making the connection with the brake rod 30' or for adjusting the position of the piston within the chamber, as will be presently explained. The body of the piston 118 is formed with a forward reduced extension 121 forming a shoulder 122. The extension 121 is further reduced in diameter to define a piston rod 64' which is projected through an axial bore in the extension 114 for connection with the brake rod 30'. A shoulder 123 is thus formed at the juncture of the piston rod and the extension 121. A compression spring 124 encircles the extension 121 and the rod 64' one end of which abuts the shoulder 122 and the other bears upon the inner end wall 125 of the extension 114. The spring holds the piston in its closed position, as shown in Figure 11.

In order that a snug pressure-tight fit may be had between the walls of the chamber 43' and the piston elements 116 and 117, these elements are each formed with an annular groove 126, of a width and depth to receive a pair of split piston rings 127.

The operation of the control valve 41' is the same as in the case of the valve 41, but it will be noted that in the closed position of the valve as shown in Figure 11, the suction line 52' is continuously open to the chamber 43', between the piston elements 116 and 117, so that upon forward movement of the piston 115 a slide control of suction through the ports 50' and 51' is accomplished.

The operation of my braking system will be readily understood from the following description, it being assumed that the indicator hand 95 has been set so as to align port 94 with ports 85 and 86 (see Figure 9), which would be desirable for driving at high speeds, since the small restricted port has a tendency to reduce acceleration resistance and will not hinder instant automatic brake action, since at high speeds in most motors, when the throttle is closed the motors will develop better than 23 inches of vacuum. Thus a small port is sufficient for proper braking action. For low speeds, such as city driving, the port 93 would be employed, which is larger than the port 94, because at low speeds vacuum is more or less reduced through intermittent throttle opening. The port 92 is employed where an emergency, harsh brake action, is required, but is only recommended for city driving or short trips, since driving resistance against acceleration becomes too great and may cause fatigue on long trips.

With the motor 10 operating a suction is created in the manifold 11, the pipes 52, 88 and 104. The suction pipe 52 unseats the check valves 99 and 61' creating a suction in tank 60 and builds up a vacuous pressure therein. The piston 64 of the control valve 41 is at this time open so that suction is created through ports 49 and 50, the pipe line 54 and to the power cylinder 55. The suction in the power cylinder draws upon the rod 57 which in turn rocks the lever 58 forwardly and thereby actuates the master cylinder 17, which applies the brakes. Suction through pipe 104 draws the piston 109 to close the throttle valve 106 and suction through the pipe 88, the valve 40 and the pipe line 39 actuates the diaphragm 34 to draw the rod 35 and the lever 29 in a direction toward the engine, thus moving the pedal 20 to its rearmost position, as shown in Figure 1.

When it is desired to put the vehicle into motion, the pedal 20 is depressed (as in ordinary acceleration) until it encounters the foot pedal 19, the latter opening the throttle 106 through the accelerator 18, the suction in cylinder 105 being overcome, free opening of the throttle valve being permitted. The vacuum in the power cylinder 32 is also counteracted by reason of backward movement of the rod 35 through similar movement of the lever 29. When the lever 29 moves rearwardly the valve 62 is moved correspondingly until the ports 49 and 50 are closed, shutting off suction therethrough. When the valve 62 is closed the power chamber 55 is vented through 77 and the chamber 74. In the event that the motor should go dead, the storage tank 60 will function to provide suction for operation of the brakes. In the event that the automatic brake feature is to be eliminated and it is desired to have a direct manual brake application, the indicator hand 95 is moved to the "off" indication, when all suction to the miniature power chamber 32 is cut off. Now when the pedal 20 is moved backwardly the valve 62 will be drawn similarly until the shoulder 78 engages the shoulder 79, causing forward movement of the valve 41, imparting a pull upon the brake rod 57 through the lever 80 and thus operating the master cylinder for applying the brakes. The clevis 45' and the lever 80 are provided with respective lost motion connections 128 to permit full gas acceleration of the motor, since the travel of the follow-up leverage is not sufficient otherwise.

Actual tests of the brake mechanism have shown a decided decrease in gasoline consumption since spasmodic acceleration is eliminated, wear on the brake mechanism, brake lining and drums reduced to a minimum, as well as producing an harmonious action throughout the driving of the vehicle. In addition, the vehicle may be held on an up-grade surface by the natural decelerating position of the foot-pedal. In fact, the operator's foot may be entirely removed from the pedal without interrupting the full braking action of the vehicle, which feature lends the structure admirably to combat use, where the operator may become disabled to an extent that he might be unable to apply the brakes.

The construction of valve shown in Figures 10 to 14 is especially well suited for use in connection with the use of hydraulic fluid, vacuum and high pressure air for power in operating the brakes and in Figure 16 there is illustrated a valve and power unit 130. It will be noted that the mechanism is compactly mounted within a supporting bracket 131, which in the present instance, consists of a base 132, apertured at suitable points for attaching bolts 133, whereby the unit may be mounted upon the chassis of a vehicle. The base 132 has a pair of right angularly disposed arms 134 and 135, arranged in opposed relation and function for support of the valve and power unit, as will now be described. The arm 134 is disposed toward the front of the chassis and upon the front face thereof a power chamber 136 is mounted, the latter having a diaphragm as in the first form of the device, the latter having an operating rod 137 projected through an aperture in the arm 134 and is pivotally connected to the depending arm 138 of the foot pedal 139. The front end of the power chamber 136 has a hose line 140 operatively connected with the intake manifold 141 of the engine 142, and the other elements for control of suction from the manifold are the same as previously described, the same reference characters are employed to designate the parts.

The valve 143 is identical with the construction shown in Figures 10 to 14 and a detailed description of the valve here is not essential to a full understanding of the operation of the present power unit. The operating rod 144 is pivotally connected with the lower end of the arm 138 so as to reciprocate the valve either by the power chamber 136 or the pedal 139 the latter being pivotally mounted in ears 139' on the base 132. The rear end of the valve 143 has a rod 145, corresponding to the rod 45' of the first forms, the terminal end of which is operatively connected to a diaphragm 146 of a hydraulic pressure chamber 147. The chamber 147 has a rearwardly extending rod 148 slidably mounted in a bearing formed upon the arm 135 of the bracket 132. The pressure chamber is of a conventional diaphragm type, but includes a pyramid-shaped spring 149 for holding the diaphragm 146 in normal position. The provision of such a spring provides an even compression throughout the travel of the rod 145.

From the foregoing description, it will be seen that the unit is very compact and may be readily installed upon a vehicle chassis without difficult machine operations or material alterations of the vehicle frame or removal of parts. The present construction also permits its installation upon vehicles in which the master cylinder and power chamber may be remotely located as will now be described. In the present instance, we will assume that the master cylinder 150 and power chamber 151 are located under the trunk compartment of a vehicle or within it, although if the design of the vehicle requires these devices be located under the hood of the vehicle, they may be so placed. In such installations, the suction line 152 of the valve 143 is of a length to be operatively connected to the power chamber 151 as at 153 so as to actuate the rod 154 to effect movement of the lever 155 of the master cylinder for forcing fluid through hose lines 156, 157, 158 and 159 so as to operate respective wheel brake units. In the line 159, a T-fitting is installed serving for connection of a hose line 161 which is connected to the rear of the pressure chamber 147 as indicated at 162, admitting braking fluid under pressure within the chamber for flexing the diaphragm 146. The valve 143 also includes a hose connection 163 which leads to a vacuum storage tank corresponding to the tank 60 of the first forms.

The operation is the same as in the first forms of the device, except that the slide of the control valve 143 is effected by fluid pressure within the pressure chamber 147 rather than through a brake rigging. Obviously, it will be possible to actuate the pressure chamber 147 by means of air pressure rather than by fluid, the only alteration in the structure being in the tension of the spring 149.

While I have specifically shown and described my brake system, this is by way of illustration only, and I consider as my own all such variations in construction as fairly fall within the scope of the appended claims.

I claim:

1. In a combined brake and accelerating mechanism for a motor vehicle, the combination of a master cylinder, a power chamber having a brake rod operatively connected to the master cylinder, a control valve having a suction port connected with the power chamber and an inlet port operatively connected to the intake manifold of the engine of the motor vehicle, a combined accelerator and brake pedal having operative connection with the control valve, a power chamber having operative connection with the intake manifold of the engine and including a connection with the combined accelerator and brake pedal, the suction created in said last named power chamber holding the control valve in open position.

2. In a combined brake and accelerator mechanism for a motor vehicle, the combination of a master cylinder, a power chamber having a brake rod operatively connected to the master cylinder, a control valve having a suction port connected with the power chamber and an inlet port, a storage tank having a hose line connected with the inlet port of the control valve, a hose line connected to the storage tank and the intake manifold of the engine and including a check valve operative to create a vacuous condition in the storage tank, a combined accelerator and brake pedal having operative connection with the control valve, a power chamber in advance of the accelerator-brake pedal and having a connection therewith and a suction line connected between the forward end of said power chamber and the intake manifold of the engine of the motor vehicle whereby suction created in the last named power chamber will move said accelerator-brake pedal and control valve into braking position.

3. The structure of claim 2 in which the suction line between the last named power chamber and the intake manifold includes a valve having a plurality of ports of different diameters whereby rate of vacuum in the last named power chamber may be established.

4. In a combined brake and accelerating mechanism for a motor vehicle, the combination of a master cylinder, a power chamber having a brake rod operatively connected to the master cylinder, a control valve housing having a suction port and an inlet port, a hose line connecting the suction port and the power chamber at the rear thereof, a vacuum storage tank having a hose line connected with the inlet port of the control valve housing, a valve reciprocable to control the inlet and suction ports, a hose line connected to the storage tank and the intake manifold of the engine of the motor vehicle and including a check valve operative to create a vacuous condition in the tank, a combined accelerator and brake pedal having a depending leg, a rod connected between the leg and the reciprocable valve, a power chamber including a diaphragm positioned in advance of the depending leg, a rod connected between the diaphragm of the last named power chamber and the leg, a suction line connected between the forward end of said last named power chamber and the intake manifold of the engine whereby suction created in said last named power chamber will move said accelerator-brake pedal to braking position and said reciprocable valve into operative position for control of vacuum in the first named power chamber to actuate the master cylinder.

5. The structure of claim 4 in which the suction line between the last named power chamber and the intake manifold includes a control valve having a plurality of ports of different diameters whereby the rate of vacuum in the last named power chamber may be established.

6. In a combined brake and accelerating mechanism for a motor vehicle, the combination of a master cylinder, a power chamber having a brake rod operatively connected to the master cylinder, a control valve housing having a suction port and an inlet port, a hose line connecting the suction port and an inlet port, a hose line connecting the suction port and the power chamber at the rear thereof, a vacuum storage tank having a hose line connected with the inlet port of the control valve housing, a valve reciprocable to control the inlet and suction ports, a hose line connected to the storage tank and the intake manifold of the engine of the motor vehicle and including a check valve operative to create a vacuous condition in the tank, said valve housing having a rearward projection, a fulcrum below the projection, a lever pivotally mounted on the fulcrum, one end having a lost-motion connection with the projection, the opposite end of the lever having a lost-motion connection with the brake rod, a combined accelerator and brake pedal having a depending leg, a rod connected between the leg and the reciprocable valve, a power chamber in advance of the depending leg, a rod connected between the diaphragm of said power chamber and the leg, a suction line connected between the forward end of the last named power chamber and the intake manifold of the engine, whereby suction created in the said last named power chamber will move said accelerator and brake pedal to braking position and said reciprocable valve into open operative position for control of fluid pressure in the first named power chamber to acuate the master cylinder, said suction line including a control valve having ports of varying diameters and a full cut-off position, and said valve housing and said reciprocable valve having cooperative stop means to effect forward movement of the housing and associated projection when said last named control valve is in full cut-off position to effect forward movement of the brake rod and operation of the master cylinder.

7. The structure of claim 6, in which the engine of the motor vehicle includes a carbureting means having a throttle valve, a cylinder, a suction piston disposed within the cylinder and operatively connected to said throttle valve, and a suction line connected between said cylinder and the intake manifold of the engine for holding the throttle valve closed but releasable upon acceleration of the engine.

8. In a combined brake and accelerating mechanism for a motor vehicle, the combination of a combined accelerator and brake pedal, a power chamber operatively connected to said pedal and having a hose connection with the intake manifold of the engine of the motor vehicle, the suction in the said power chamber holding said accelerator-brake pedal in brake-applying position, a second power chamber, a control valve having a suction port operatively connected to said power chamber and an inlet port operatively connected to the intake manifold of the engine, said control valve including a reciprocable valve for controlling suction between the inlet and suction ports and having one end connected to the combined accelerator-brake pedal, a master cylinder, said second named power chamber having a piston operatively connected to said master cylinder for actuating the latter and yielding pressure means between said last named power chamber and said control valve whereby to regulate the movement of the reciprocable valve between the suction and inlet ports.

9. The structure of claim 8, in which the yielding pressure means consists of a diaphragm pressure chamber having a hose connection with the fluid circuit of the hydraulic brakes, the pressure on the diaphragm being such as to maintain the inlet and suction ports in open relation.

10. The structure of claim 8 in which the first named power chamber, brake pedal, the control valve and pressure means are mounted within a frame as a unit.

HARLEY C. MACK.

REFERENCES CITED

The following references are of record in the file of this patent:

UNITED STATES PATENTS

| Number | Name | Date |
|---|---|---|
| 1,503,939 | Davis | Aug. 5, 1924 |
| 1,565,458 | Hukill | Dec. 15, 1925 |
| 1,824,050 | Joers et al. | Sept. 22, 1931 |
| 1,859,708 | Lormuller | May 24, 1932 |
| 1,918,025 | Frankford | July 11, 1933 |
| 2,277,584 | Freeman | Mar. 24, 1942 |
| 2,300,136 | Rockwell | Oct. 27, 1942 |
| 2,309,051 | Dodge | Jan. 19, 1943 |
| 2,316,396 | Breese | Apr. 13, 1943 |